(12) United States Patent
Laster et al.

(10) Patent No.: US 12,358,599 B2
(45) Date of Patent: Jul. 15, 2025

(54) NAVIGATION OF A BOUNDARY AREA USING DRIFT

(71) Applicant: NAVICO, INC., Tulsa, OK (US)

(72) Inventors: Matthew W. Laster, Broken Arrow, OK (US); Michael C. Kaste, Tulsa, OK (US)

(73) Assignee: Navico, Inc., Tulsa, OK (US)

( * ) Notice: Subject to any disclaimer, the term of this patent is extended or adjusted under 35 U.S.C. 154(b) by 201 days.

(21) Appl. No.: 17/863,577

(22) Filed: Jul. 13, 2022

(65) Prior Publication Data

US 2024/0017801 A1   Jan. 18, 2024

(51) Int. Cl.
*B63B 49/00* (2006.01)
*G05D 1/00* (2024.01)

(52) U.S. Cl.
CPC ........... *B63B 49/00* (2013.01); *G05D 1/0206* (2013.01)

(58) Field of Classification Search
CPC ........... B60W 60/0011; B60W 30/095; B60W 30/143; B60W 30/18163; B60W 40/02;
(Continued)

(56) References Cited

U.S. PATENT DOCUMENTS 4,597,349 A * 7/1986 Dolfi .................... G05D 1/0206 114/144 R
5,172,324 A * 12/1992 Knight ................. G05D 1/0206 701/530

(Continued)

FOREIGN PATENT DOCUMENTS

AU   2013365921 B2   4/2018
AU   2014375084 B2   7/2019
(Continued)

OTHER PUBLICATIONS

Translation of WO-2008096376-A1 retrieved from PE2E Search from May 16, 2024 (Year: 2024).*

(Continued)

*Primary Examiner* — Fadey S. Jabr
*Assistant Examiner* — Faris Asim Shaikh
(74) *Attorney, Agent, or Firm* — Nelson Mullins Riley & Scarborough LLP

(57) ABSTRACT

Systems and method for providing navigational control of a watercraft are provided herein. The system comprises a display, processor and memory. The memory including computer program code is configured to cause presentation of a chart on the display including at least a portion of the body of water. The system further receives user input indicating initiation of a drift protocol, including indication of a boundary area for which the watercraft will drift through, and causes presentation of the boundary area on the chart. The system determines an instance when the watercraft drifts outside of the boundary area and provides an alert when the watercraft exits or nears the boundary area. The system determines a starting position corresponding to the boundary area and engages an autopilot to cause the watercraft to navigate to the starting position or provides instructions to enable the user to navigate the watercraft to the starting position.

20 Claims, 12 Drawing Sheets

(58) Field of Classification Search
CPC ......... B60W 40/105; B60W 2554/801; B60W 2554/802; B60W 2555/20; B60W 30/09; B60W 2554/804; B60W 60/001; B60W 50/00; B60W 2050/0034; B60W 2552/50; B60W 2754/30; B60W 10/20; B60W 2554/80; B60W 30/0956; B60W 2520/105; B60W 2754/20; B60W 50/0097; B60W 2754/50; B60W 2050/0028; B60W 2554/4045; B60W 30/16; G06V 20/58; G06V 20/588; G06V 20/64; B60T 2201/02; B60T 2201/022; G01C 21/3602; G08G 1/167; G05D 1/0221; G05D 1/0223; G05D 1/0257; G05D 2201/02

See application file for complete search history.

(56) References Cited

U.S. PATENT DOCUMENTS

| | | | |
|---|---|---|---|
| 5,525,081 A | 6/1996 | Mardesich et al. | |
| 6,401,036 B1 * | 6/2002 | Geier | G01C 21/188 |
| | | | 701/472 |
| 7,209,829 B2 | 4/2007 | Litvack et al. | |
| 7,268,703 B1 | 9/2007 | Kabel et al. | |
| 7,818,120 B2 | 10/2010 | Poreda et al. | |
| 8,296,001 B1 | 10/2012 | Kabel et al. | |
| 8,463,458 B2 | 6/2013 | Wood et al. | |
| 8,463,470 B2 | 6/2013 | Wood et al. | |
| 8,510,046 B2 | 8/2013 | Kabel et al. | |
| 8,543,269 B1 | 9/2013 | Wood et al. | |
| 8,577,525 B2 | 11/2013 | Wood et al. | |
| 8,606,432 B1 | 12/2013 | Wood et al. | |
| 8,645,012 B2 | 2/2014 | Salmon et al. | |
| 8,717,847 B2 | 5/2014 | Blake | |
| 9,086,278 B2 | 7/2015 | Carnevali | |
| 9,267,804 B1 | 2/2016 | Steward et al. | |
| 9,405,445 B2 | 8/2016 | Carnevali | |
| 9,423,258 B2 | 8/2016 | Kabel et al. | |
| 9,423,259 B2 | 8/2016 | Kabel et al. | |
| 9,851,206 B2 | 12/2017 | Kabel et al. | |
| 9,909,891 B2 | 3/2018 | Langford-Wood | |
| 9,945,673 B2 | 4/2018 | Carnevali | |
| 10,179,633 B2 | 1/2019 | Carnevali | |
| 10,290,124 B2 | 5/2019 | Steward | |
| 10,414,472 B2 * | 9/2019 | Clark | G01S 15/96 |
| 10,460,484 B2 | 10/2019 | Hovland et al. | |
| 10,473,781 B2 | 11/2019 | Wiegers | |
| 11,022,441 B2 | 6/2021 | Clark et al. | |
| 2005/0263058 A1 * | 12/2005 | Suemori | B63H 20/12 |
| | | | 114/144 R |
| 2006/0064242 A1 | 3/2006 | Litvack et al. | |
| 2006/0089794 A1 | 4/2006 | Depasqua | |
| 2006/0191185 A1 | 8/2006 | Hansen | |
| 2008/0133131 A1 | 6/2008 | Poreda et al. | |
| 2010/0023262 A1 * | 1/2010 | Haney | B63J 99/00 |
| | | | 701/469 |
| 2011/0054784 A1 | 3/2011 | Wood et al. | |
| 2011/0313655 A1 | 12/2011 | Litvack et al. | |
| 2012/0232719 A1 | 9/2012 | Salmon et al. | |
| 2013/0242700 A1 | 9/2013 | Blake | |
| 2013/0297387 A1 * | 11/2013 | Michael | G06Q 30/02 |
| | | | 705/13 |
| 2015/0051836 A1 | 2/2015 | Langford-Wood | |
| 2015/0226575 A1 | 8/2015 | Rambo | |
| 2016/0092017 A1 * | 3/2016 | Bates | G06F 3/0485 |
| | | | 345/173 |
| 2017/0210449 A1 | 7/2017 | Frisbie et al. | |
| 2017/0227362 A1 | 8/2017 | Pryszo et al. | |
| 2017/0284809 A1 * | 10/2017 | Tanaka | G08G 3/02 |
| 2017/0365175 A1 * | 12/2017 | Harnett | B63H 20/14 |
| 2017/0370724 A1 | 12/2017 | Hovland et al. | |
| 2018/0059230 A1 | 3/2018 | Snyder | |
| 2018/0129213 A1 | 5/2018 | Pelin et al. | |
| 2018/0229823 A1 * | 8/2018 | Inoue | G05D 1/0208 |
| 2019/0235528 A1 * | 8/2019 | Ito | G01C 21/20 |
| 2019/0331779 A1 * | 10/2019 | Sandretto | G01S 7/52004 |
| 2020/0049507 A1 | 2/2020 | Clark et al. | |
| 2020/0132467 A1 * | 4/2020 | Borovac | G01C 21/20 |
| 2021/0078689 A1 * | 3/2021 | Zhou | B63B 34/10 |
| 2021/0221485 A1 * | 7/2021 | Grunewald Mayer | G08G 3/02 |
| 2022/0324544 A1 * | 10/2022 | Kottke | G08G 3/02 |
| 2023/0102473 A1 * | 3/2023 | Kunz | B63B 79/40 |
| | | | 701/21 |
| 2023/0103359 A1 * | 4/2023 | Rivers | H04N 7/181 |
| | | | 701/2 |
| 2023/0195118 A1 * | 6/2023 | Singh | B63B 79/15 |
| | | | 701/21 |
| 2023/0273026 A1 * | 8/2023 | Davis | G01C 21/203 |
| | | | 701/21 |
| 2023/0314144 A1 * | 10/2023 | Lee | G01C 21/16 |
| | | | 701/21 |

FOREIGN PATENT DOCUMENTS

| | | | |
|---|---|---|---|
| CA | 2 580 920 A1 | 4/2006 | |
| CA | 2 777 338 A1 | 11/2012 | |
| CA | 2 895 403 A1 | 6/2014 | |
| CA | 2 933 304 A1 | 7/2015 | |
| EP | 1 794 547 A2 | 6/2007 | |
| EP | 3 027 501 A1 | 6/2016 | |
| EP | 3 090 234 A2 | 11/2016 | |
| JP | 2016-528548 A | 9/2016 | |
| WO | WO 2006/036561 A2 | 4/2006 | |
| WO | WO 2008/067151 A2 | 6/2008 | |
| WO | WO-2008096376 A1 * | 8/2008 | ............ B63B 49/00 |
| WO | WO 2014/096960 A2 | 6/2014 | |
| WO | WO 2015/011871 A1 | 1/2015 | |
| WO | WO 2015/017800 A1 | 2/2015 | |
| WO | WO 2015/101834 A2 | 7/2015 | |
| WO | WO-2017128138 A1 * | 8/2017 | |
| WO | WO 2021/122836 A1 | 6/2021 | |

OTHER PUBLICATIONS

Translation of WO-2017128138-A1 retrieved from IP.com from May 30, 2024 (Year: 2024).*

"Using i-Pilot Link to record iTracks with Jason Halfen;" *The Technological Angler*; retrieved Sep. 22, 2022 from https://www.youtube.com/watch?v=-raVsOhbfTo.

* cited by examiner

NAVIGATION OF A BOUNDARY AREA USING DRIFT

FIELD OF THE INVENTION

Embodiments of the present invention relate generally to navigating a marine environment, and more particularly, to defining a drift protocol through a boundary area to allow a watercraft to drift therethrough.

BACKGROUND OF THE INVENTION

In bodies of water (e.g., lakes, rivers, bays, etc.) there may be areas which are more habitable for fish and other marine species, and thus, may be advantageous to fish within. In order to fish in a desired area, the user (e.g., fisherman) may anchor a watercraft. Thus, a user may engage an autopilot system to stay in or around the determined spot. The autopilot may also follow a predefined route or pattern. However, the autopilot engages a motor to follow a path or maintain a predetermined position. Such motorized activity may be less desirable for a fishing experience.

BRIEF SUMMARY OF THE INVENTION

Depending on the fishing activity, a user may wish to drift past a desirable fishing habitat (e.g., across a shipwreck, structure, reef, etc.). Accordingly, it may be desirable for a user to determine a drift protocol that factors in environmental conditions (e.g., wind, current, etc.) that causes the watercraft to drift across the desirable fishing habitat—thereby allowing the user to focus on the fishing activity while the drift takes place. This may be accomplished, in some cases, without use of a motor (although a motor can be used in some cases, such as to keep a desired orientation, etc.). Additionally, however, instead of forcing a user to determine when they drift past the desirable fishing habitat and stop fishing in order to try to reposition the watercraft, some embodiments of the present invention contemplate determining when the watercraft is about to drift past the desirable fishing habitat (or other desirable area) and alert the user and/or automatically navigate the watercraft back to re-start a drift across the desirable fishing habitat. This provides for a more pleasant fishing experience without much disruption.

Accordingly, some embodiments of the present invention enable a user to define a boundary area, to allow the watercraft to drift within the boundary area. When the watercraft crosses the boundary area perimeter (e.g., exits the boundary area) the system may alert the user and/or engage an autopilot to navigate the watercraft to a starting point to restart the drift through the boundary area. Thus, the user may drift within the boundary area according to currents, and environmental conditions, and return to the starting point, thereby allowing the user to fish during the entire drift, without having to reposition and maneuver the watercraft to the boundary area.

In an example embodiment, a system for providing navigation control of a watercraft on a body of water is provided. The system comprises a display, a processor and a memory including a computer program code. The computer program code is configured to, when executed, cause the processor to cause, on the display, presentation of a chart indicating at least a portion of a body of water. The computer program code is further configured to, when executed, cause the processor to receive user input indicating initiation of a drift protocol. The user input includes an indication of a boundary area for which the watercraft is to drift through. The computer program code is further configured to, when executed, cause the processor to cause, on the display, presentation of the boundary area on the chart, and determine an instance in which the watercraft drifts outside of the boundary area or is nearing a perimeter of the boundary area. The computer program code is further configured to, when executed, cause the processor to cause, in response to determining that the watercraft has drifted outside of the boundary area or is nearing the perimeter of the boundary area, an alert to be provided to the user indicating that the watercraft is outside of the boundary area or near the perimeter of the boundary area. The computer program code is further configured to, when executed, cause the processor to determine a starting position corresponding to the boundary area. The starting position is a position relative to the boundary area that enables the watercraft to drift under influence of nature through the boundary area. The computer program code is further configured to, when executed, cause the processor to either cause an autopilot to cause the watercraft to navigate to the starting position, or to cause presentation of one or more instructions on the display to enable a user to navigate or cause navigation of the watercraft to the starting position.

In some embodiments, the memory and the computer program code may be further configured to, when executed, cause the processor to cause the autopilot of the watercraft to cease propulsion of the watercraft once the watercraft reaches the starting position. In some embodiments, the boundary area may correspond to at least a portion of a known structure. The known structure may be at least partially submerged within the body of water.

In some embodiments, the memory and the computer program code may be further configured to, when executed, cause the processor to receive data corresponding to environmental conditions, and determine a drift effect based on the received environmental conditions. The memory and the computer program code may be further configured to, when executed, cause the processor to determine the starting position to maximize a drift time within the boundary area based on the determined drift effect.

In some embodiments, the memory and the computer program code may be further configured to, when executed, cause the processor to determine the watercraft is outside of the boundary area, and to determine if the watercraft will reenter the boundary area based on the drift effect. In some embodiments, the environmental conditions are at least one of a tidal effect, a wind speed, a wind direction, or current. In some embodiments, the memory and the computer program code may be further configured to, when executed, cause the processor to record a track corresponding to the drift effect, and to determine the starting location such that a second drift follows the track corresponding to the drift effect.

In some embodiments, the starting position may be different than a previous starting position. In some embodiments, the starting position may be selected by a user. In some embodiments, the computer program code may be further configured to, when executed, cause the processor to determine an orientation of the watercraft, and cause, in response to determining the watercraft is not in a predetermined orientation, the watercraft to rotate to the predetermined orientation.

In some embodiments, the memory and the computer program code may be further configured to, when executed, cause the processor to cause operation of one or more motors to maintain a predetermined orientation of the watercraft while engaged in the drift protocol. In some embodiments, the system may further comprise at least one reel, and the computer program code may be further configured to, when executed, cause the processor to receive an indication the autopilot has engaged propulsion to travel to the starting position, and retract a lure associated with a reel upon receipt of the indication.

In another example embodiment, a method of providing navigation control of a watercraft on a body of water is provided. The method comprises causing, on a display, presentation of a chart indicating at least a portion of a body of water. The method further includes receiving user input indicating initiation of a drift protocol. The user input includes an indication of a boundary area for which the watercraft is to drift through. The method further includes causing, on the display, presentation of the boundary area on the chart, and determining an instance in which the watercraft drifts outside of the boundary area. The method further includes determining a starting position corresponding to the boundary area. The starting position being a position relative to the boundary area that enables the watercraft to drift under the influence of nature through the boundary area. The method further includes either causing an autopilot to cause the watercraft to navigate to the starting position, or causing presentation of one or more instructions on the display to enable a user to navigate or cause navigation of the watercraft to the starting position.

In some embodiments, the method may further comprise causing, in response to determining that the watercraft has drifted outside of the boundary area, an alert to be provided to the user indicating that the watercraft is outside of the boundary area. In some embodiments, the method may further comprise causing the autopilot of the watercraft to cease propulsion of the watercraft once the watercraft reaches the starting position.

In some embodiments, the method may further comprise receiving data corresponding to environmental conditions, and determining an effect on drift of the received environmental conditions. In some embodiments, the method may further comprise determining the starting position to maximize a drift time based on the effect on drift of the received environmental conditions. In some embodiments, the environmental conditions may be at least one of a tidal effect, a wind speed, a wind direction or current. In some embodiments, the method may further comprise maintaining a predetermined orientation of the watercraft while engaged in the drift protocol.

In yet another example embodiment, a system for providing navigation control of a watercraft on a body of water is provided. The system comprises a display, a processor and a memory including a computer program code. The computer program code is configured to, when executed, cause the processor to cause, on the display, presentation of a chart indicating at least a portion of a body of water. The computer program code is further configured to, when executed, cause the processor to receive user input indicating initiation of a drift protocol. The user input includes an indication of a boundary area for which the watercraft is to drift through. The computer program code is further configured to, when executed, cause the processor to cause, on the display, presentation of the boundary area on the chart, and determine an instance in which the watercraft drifts within a threshold distance of the boundary area. The computer program code is further configured to, when executed, cause the processor to cause, in response to determining that the watercraft has drifted within the threshold boundary area, an alert to be provided to the user indicating that the watercraft is within the threshold distance of the boundary area. The computer program code is further configured to, when executed, either determine a starting position corresponding to the boundary area, or determine an extended boundary are. The starting position is a position relative to the boundary area that enables the watercraft to drift under influence of nature through the boundary area, and the extended boundary area is configured to allow the watercraft to continue to drift for an extended amount of time.

In some embodiments, the computer program code, may be further configured to, when executed, cause the processor to determine if a selection has been made within a threshold time, and in response to no selection being made, extend the boundary area to the extended boundary area.

BRIEF DESCRIPTION OF THE DRAWINGS

Figure 1:
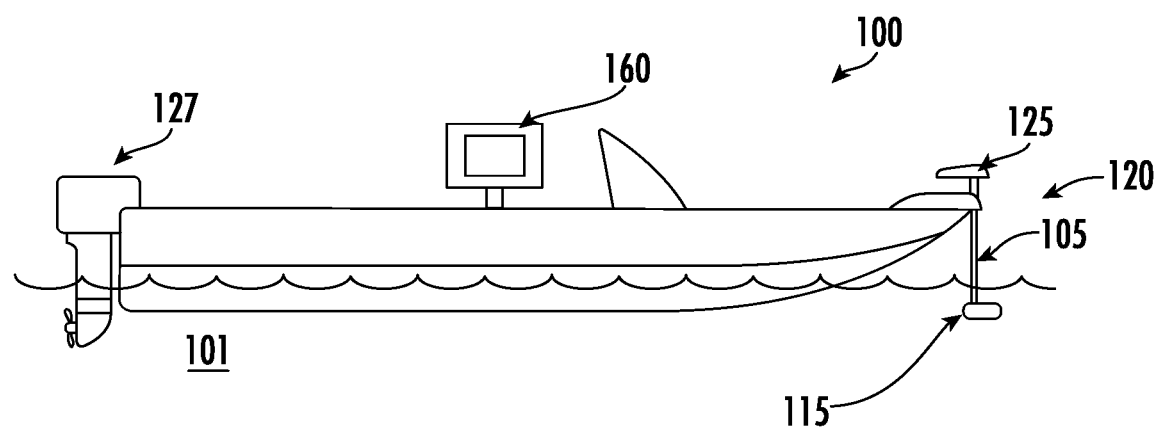
Figure 2:
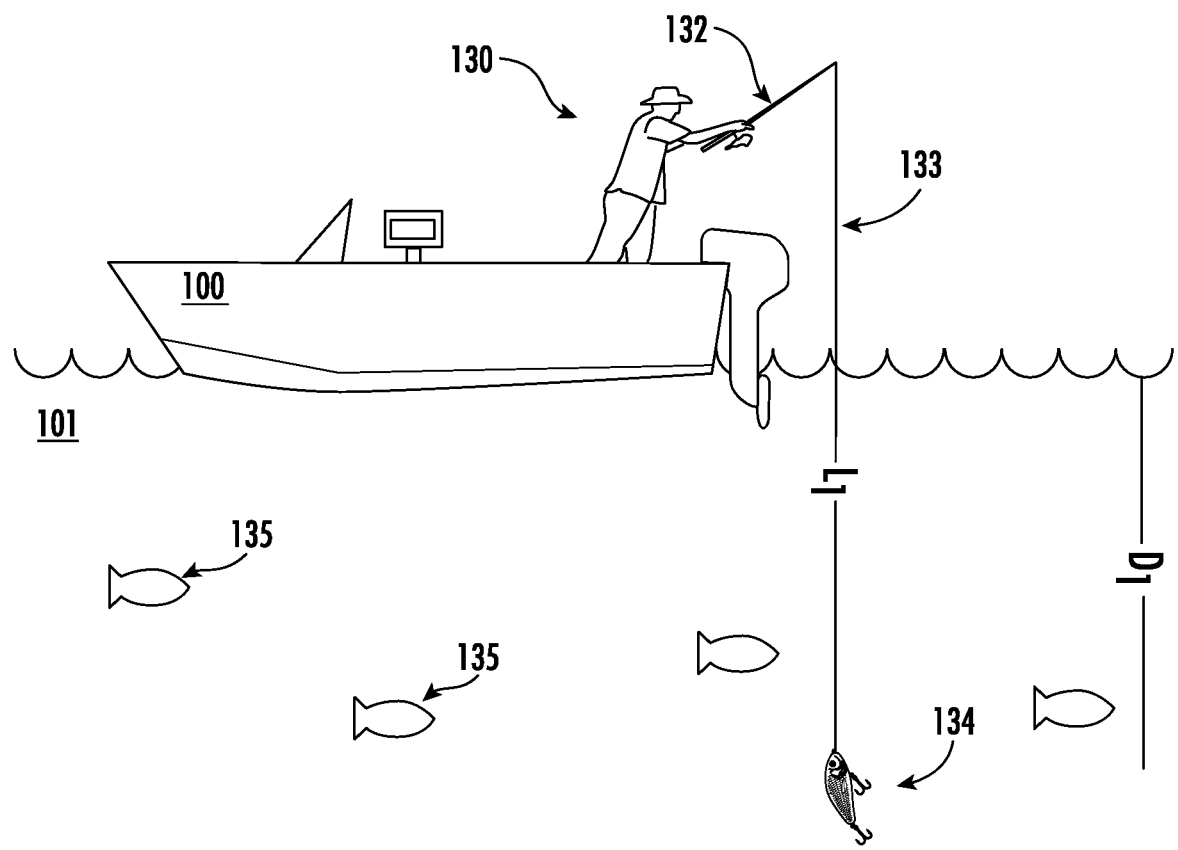
Figure 3:
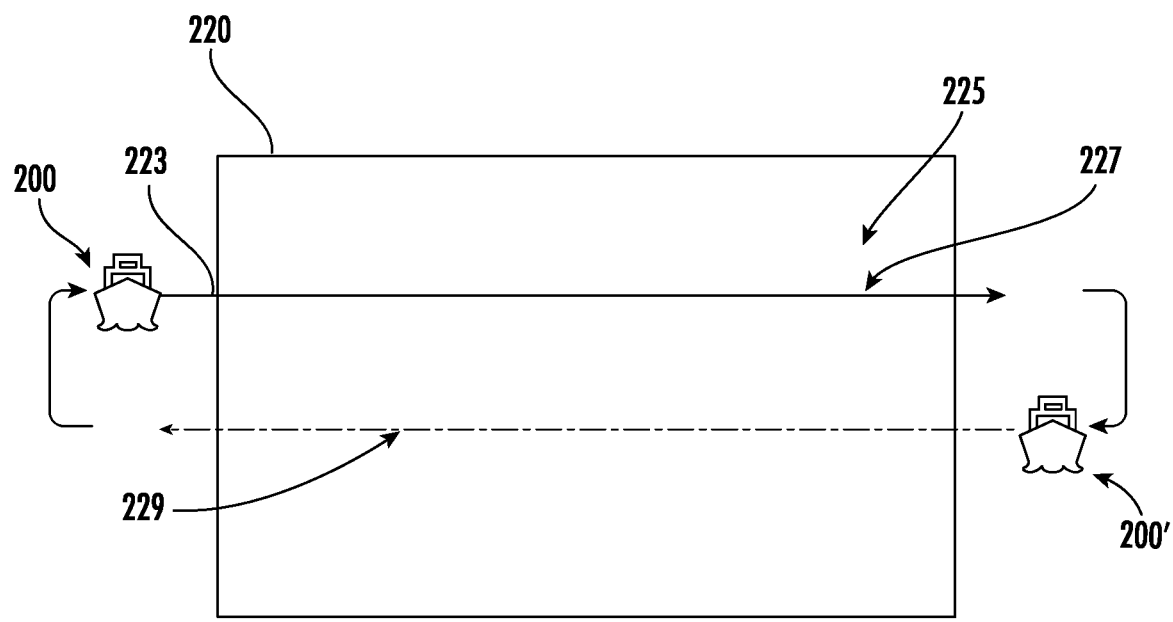
Figure 4A:
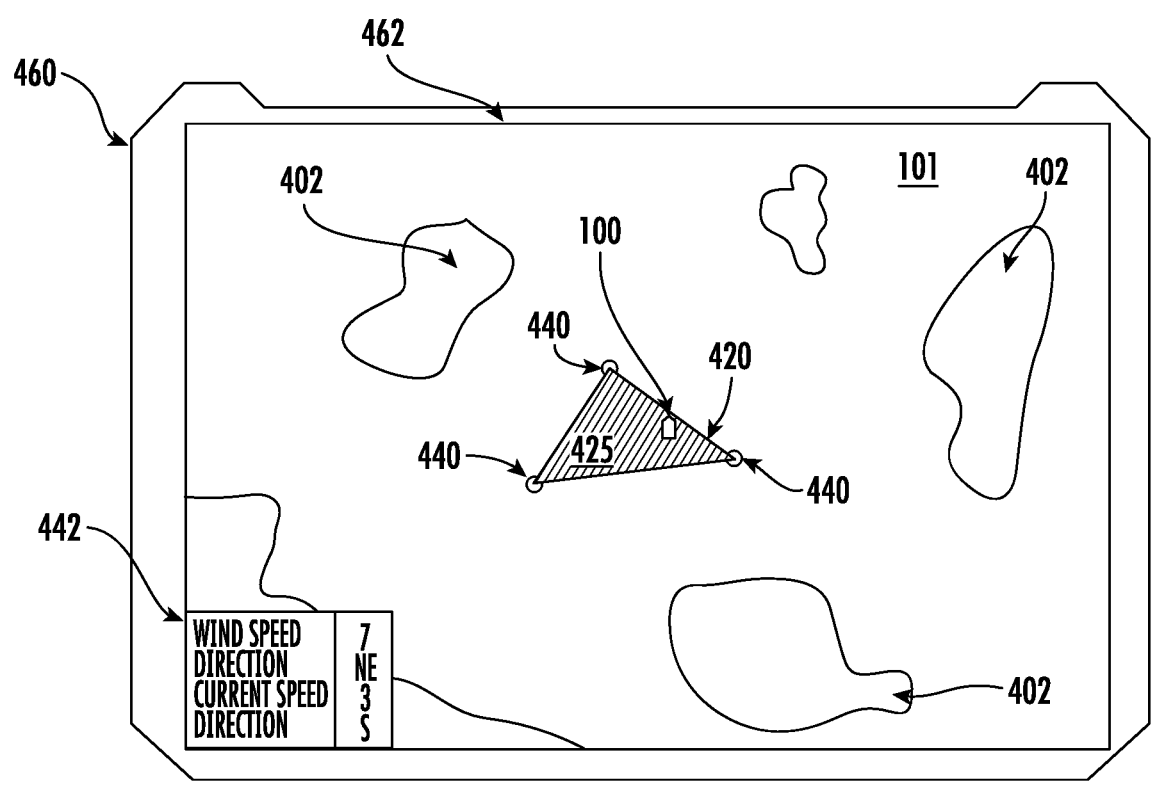
Figure 4B:
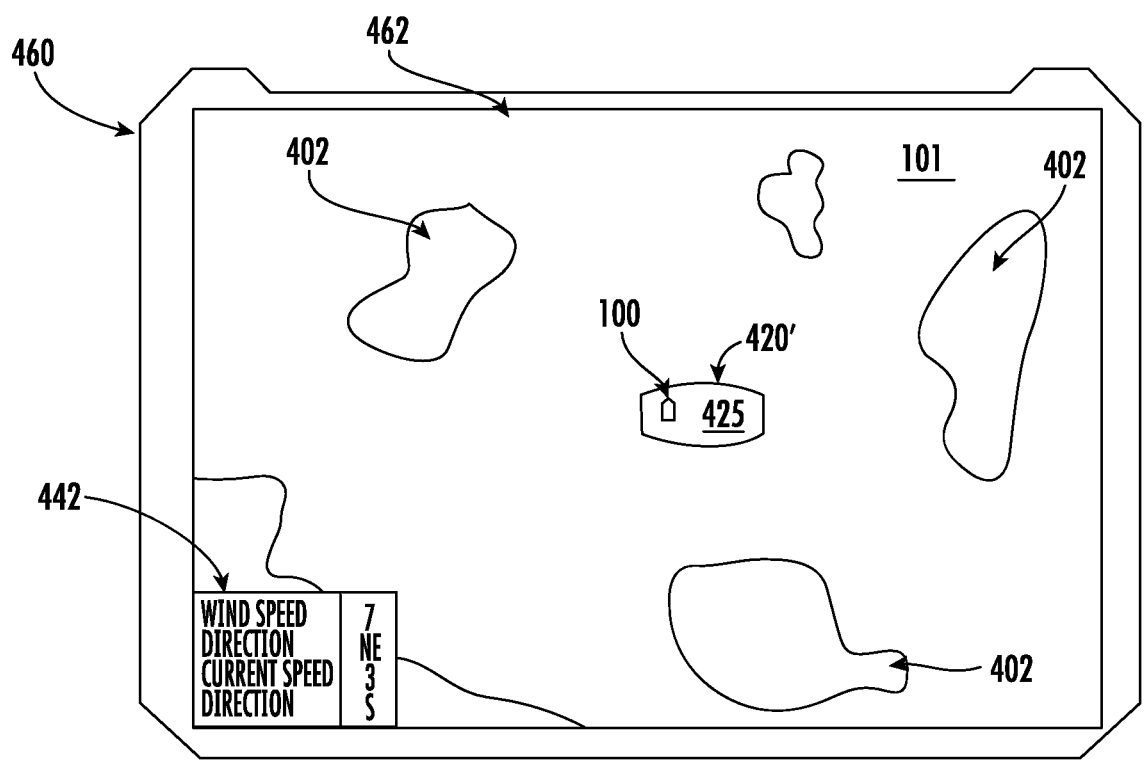
Figure 5A:
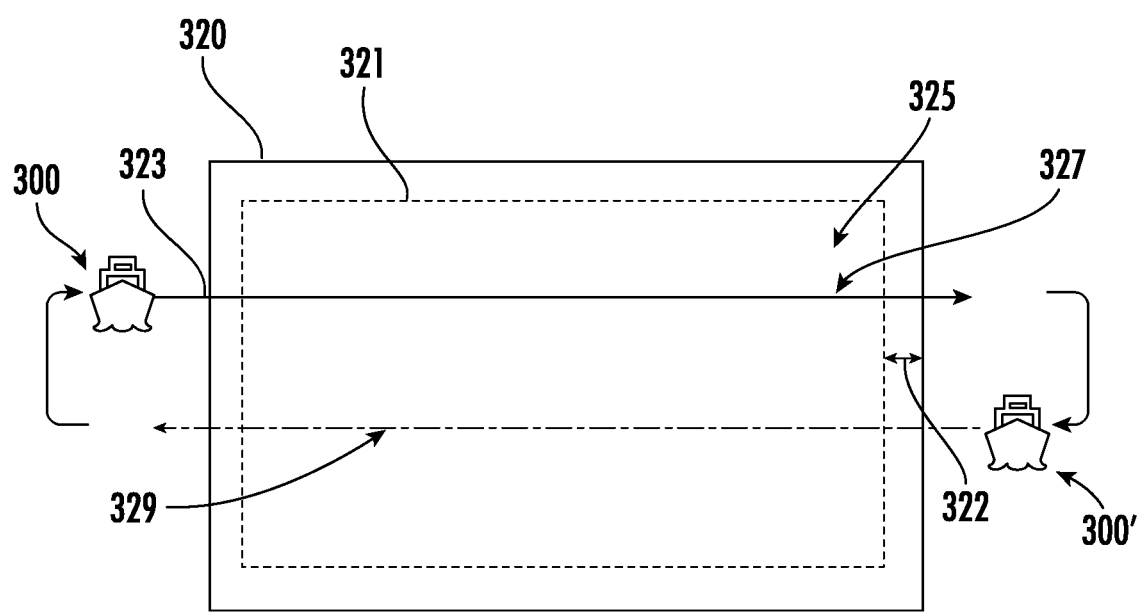
Figure 5B:
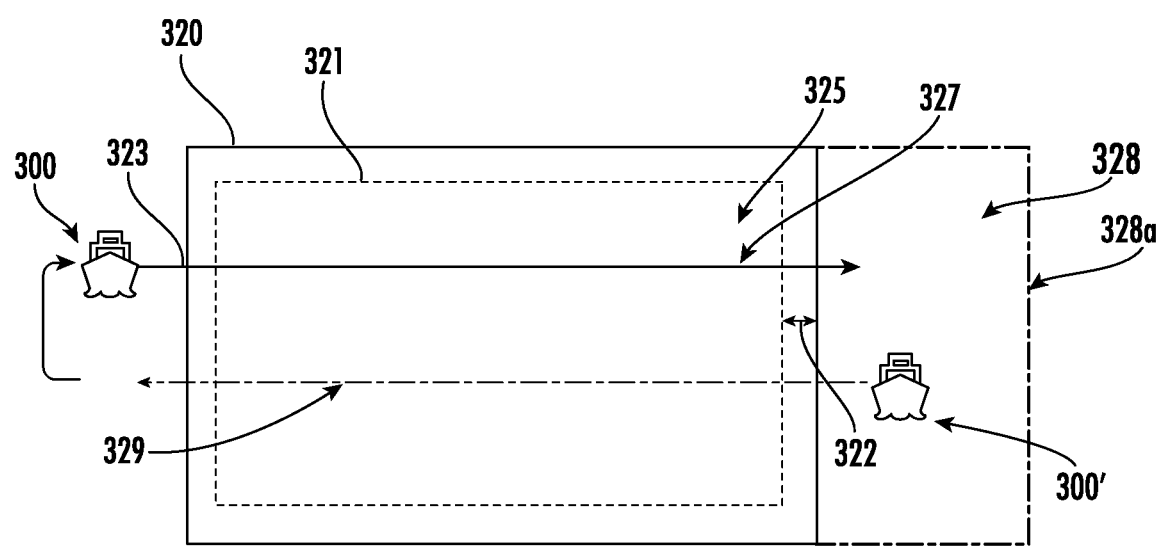
Figure 6A:
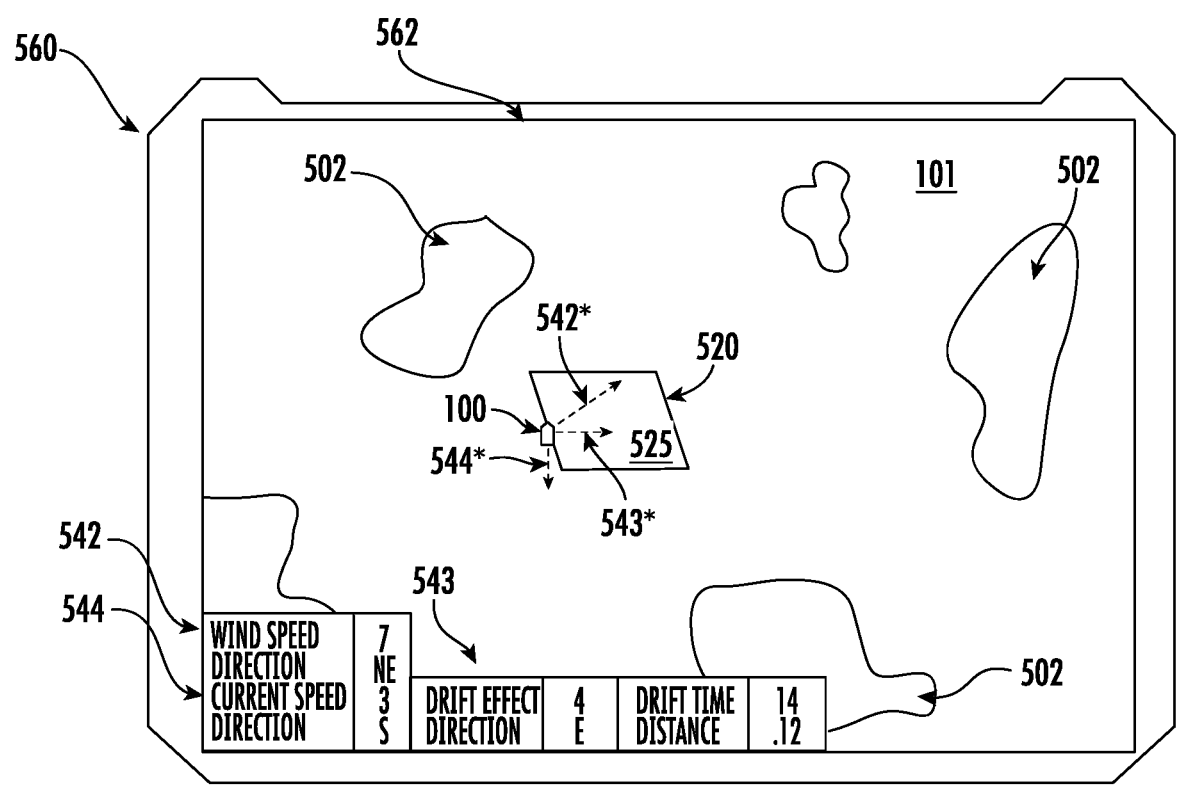
Figure 6B:
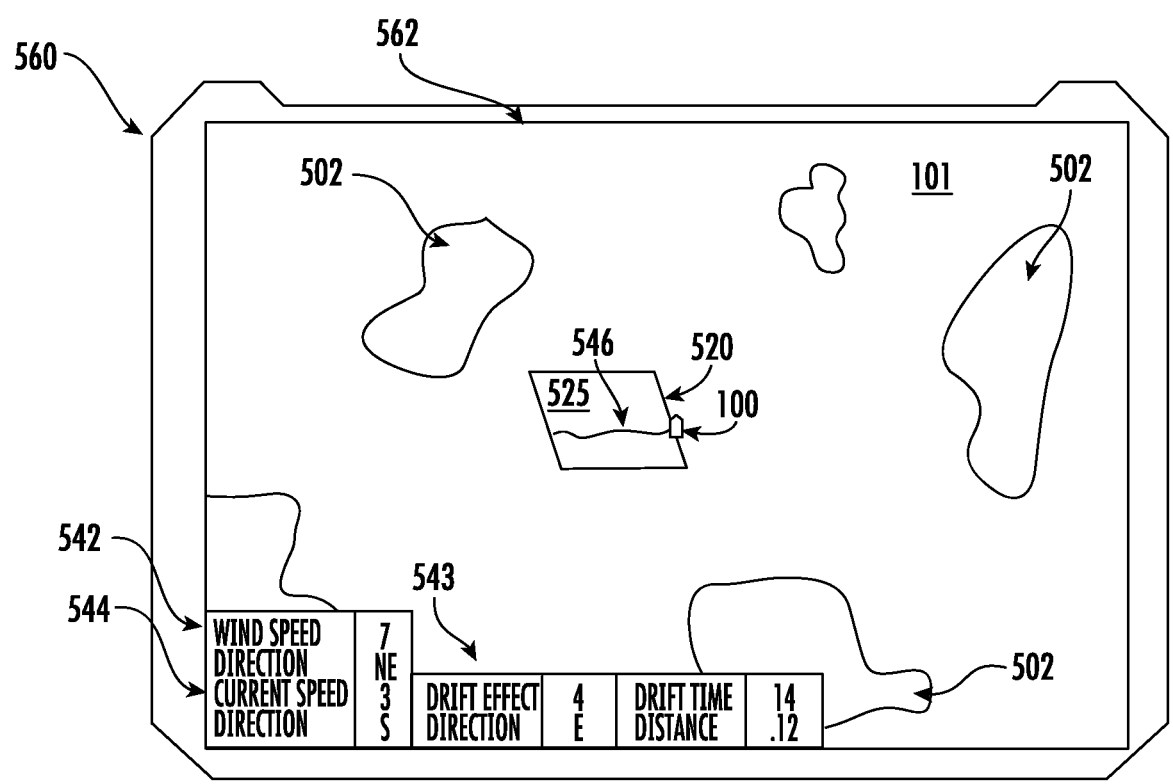
Figure 6C:
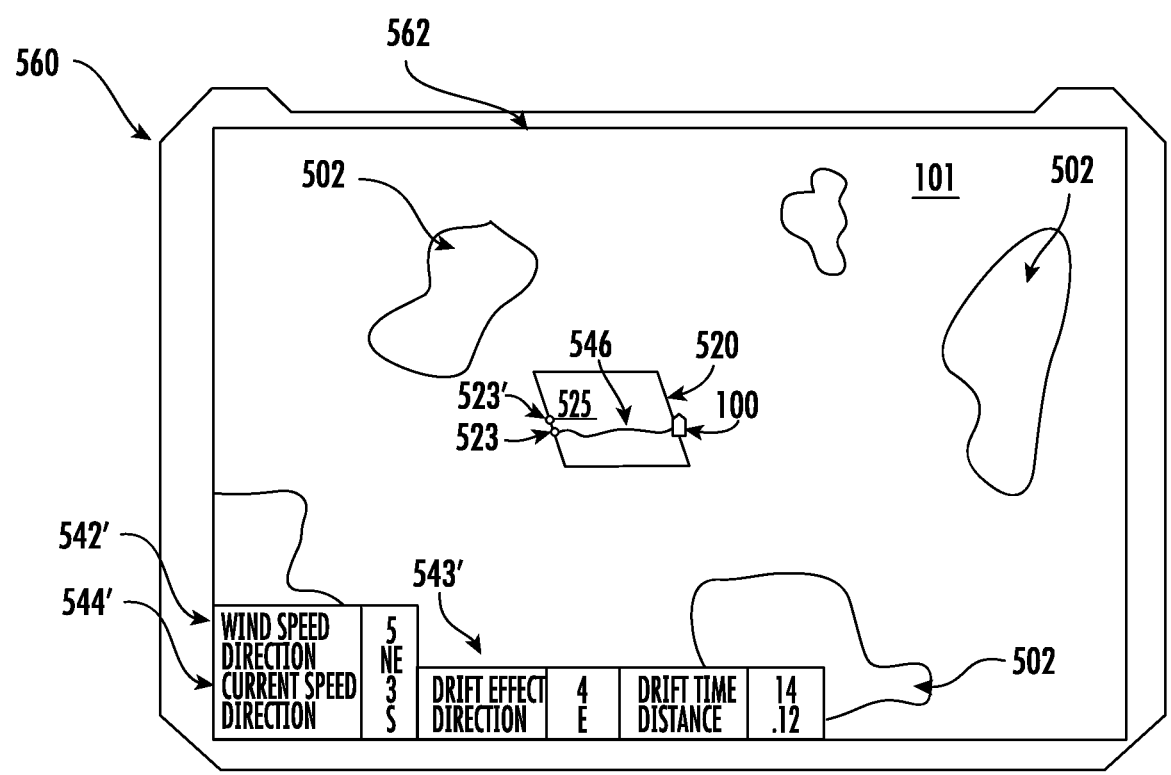
Figure 7:
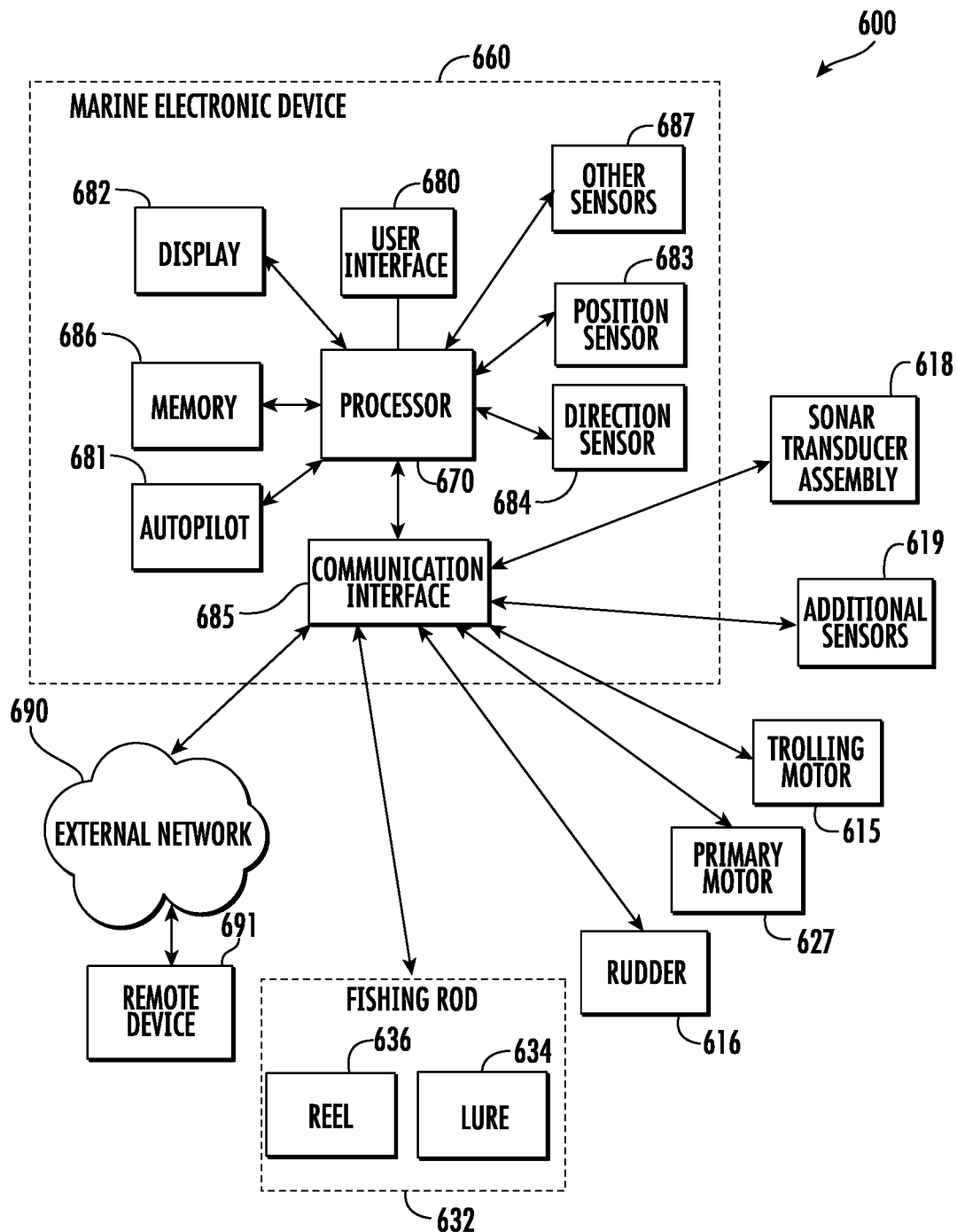
Figure 8:
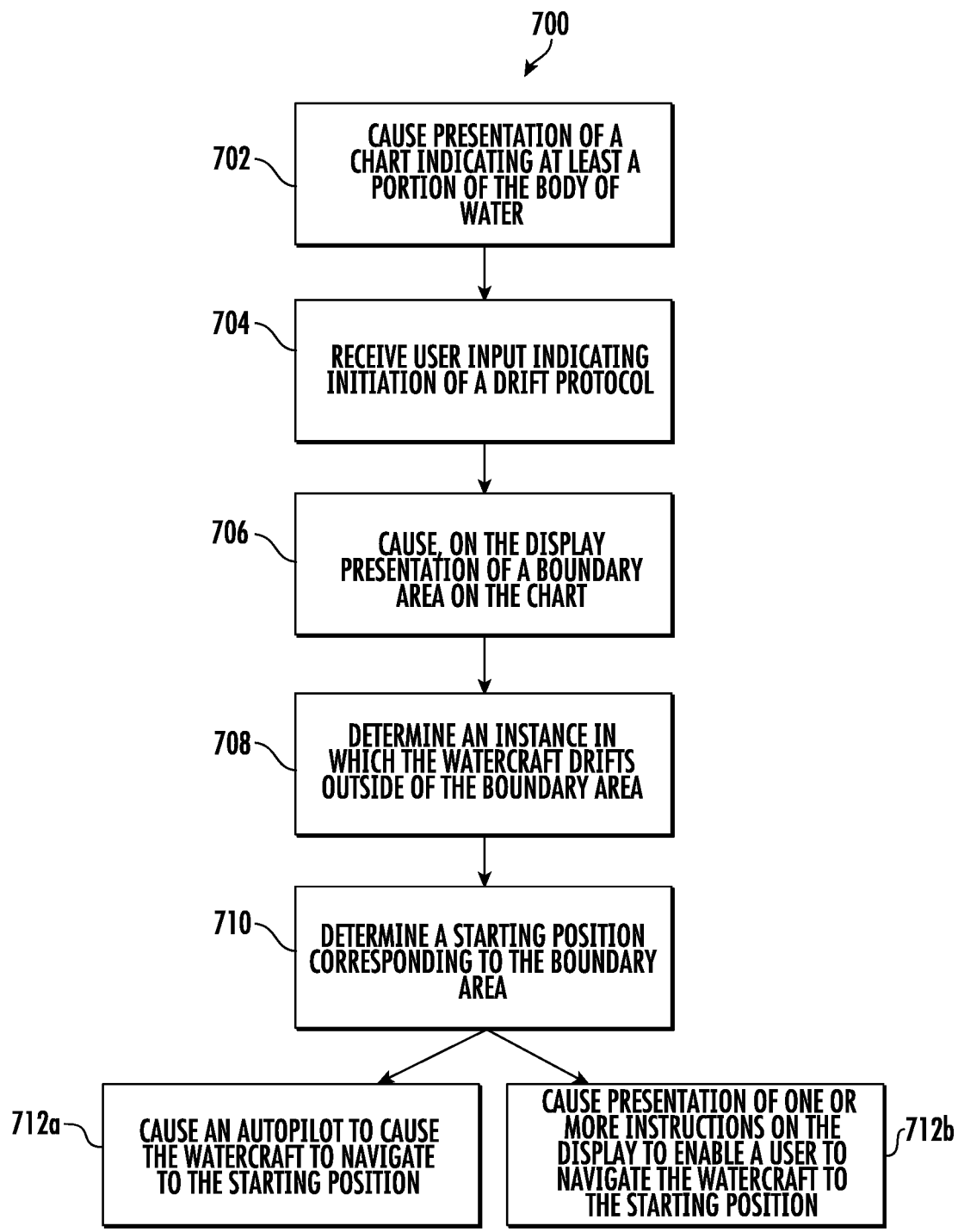

Having thus described the invention in general terms, reference will now be made to the accompanying drawings, which are not necessarily drawn to scale, and wherein:

FIG. 1 illustrates an example watercraft including various marine devices, in accordance with some embodiments discussed herein;

FIG. 2 illustrates an example lure positioned within the body of water while a watercraft drifts, in accordance with some embodiments discussed herein;

FIG. 3 illustrates an example drift and return of a watercraft within an example boundary area, in accordance with some embodiments discussed herein;

FIG. 4A-B illustrate an example display presenting a chart illustrating example boundary areas, in accordance with some embodiments discussed herein;

FIG. 5A illustrates an example drift and return of watercraft within an example boundary area, in accordance with some embodiments discussed herein;

FIG. 5B illustrates an example extended boundary area, in accordance with some embodiments discussed herein;

FIG. 6A illustrates the example display presenting the chart, to estimate a drift effect of the environmental conditions on the watercraft, in accordance with some embodiments discussed herein;

FIG. 6B illustrates the example display presenting the chart, with a recorded track corresponding to the drift effect illustrated in FIG. 6A, in accordance with some embodiments discussed herein;

FIG. 6C illustrates the example display presenting the chart, depicting a starting location to follow the drift effect illustrated in FIG. 6B, in accordance with some embodiments discussed herein;

FIG. 7 illustrates a block diagram of an example system with various electronic devices, marine devices, and secondary devices shown, in accordance with some embodiments discussed herein; and FIG. 8 illustrates a flowchart of an example method of providing navigation control of a watercraft on a body of water, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout.

FIG. 1 illustrates an example watercraft 100 including various marine devices, in accordance with some embodiments discussed herein. As depicted in FIG. 1, the watercraft 100 is configured to traverse a marine environment, e.g., a body of water 101. The watercraft 100 has a trolling motor assembly 120 having a trolling motor housing 115 submerged in the body of water 101. The trolling motor within the trolling motor housing 115, which may be gas-powered or electric, for example, may be used as a propulsion system to provide thrust so as to cause the watercraft 100 to travel along the surface of the water. The trolling motor housing 115 may be attached to a bottom end of a shaft 105, while a main housing 125 may be attached to a top end of the shaft 105 and positioned out of the body of water 101. While the depicted embodiment shows the trolling motor assembly 120 attached to the front of the watercraft 100 as a secondary propulsion system, and a primary motor 127 attached at the rear, example embodiments described herein contemplate that the trolling motor assembly 120 may be attached in any position on the watercraft 100 and/or may serve as the primary propulsion system for the watercraft 100.

In accordance with various aspects of the present teachings, the trolling motor assembly 120 may be in communication with a marine electronics device 160, such as may be utilized by a user to interact with, view, or otherwise control various functionality regarding the watercraft 100 including for example nautical charts and various sonar systems described herein. In some embodiments, the marine electronics device 160 may be positioned near the helm (e.g., steering wheel) of the watercraft 100—although other places on the watercraft 100 are contemplated. Likewise, additionally or alternatively, a remote device (such as a user's mobile device) may include functionality of a marine electronics device 160.

In some embodiments, such as illustrated in FIG. 2, a user may be a fisherman 130 using a fishing rod 132 to fish (although other fishing set-ups are contemplated, including, for example, using an automated lure control). A lure 134 may be attached to a fishing line 133 of the fishing rod 132. In some embodiments, the fisherman 130 may extend or retract the fishing line 133 to be positioned at a depth Di corresponding to a fish habitat. Depending on the speed of travel, the fishing line 133 may descend vertically, or almost vertically into the body of water 101 and define a length Li, that corresponds to (e.g., fits within) a depth Di of the fish habitat. Thus, the lure 134 is within the fish habitat which may allow the fisherman 130 to catch a fish 135. In this regard, a user may position the lure 134 at a desirable depth to use during a drift protocol (e.g., as the watercraft drifts through the body of water across the desirable fish habitat).

As discussed above, fish may have localized habitats in certain areas of a body of water (e.g., a structure, a marsh, rocky area, etc.). These locations may provide food and shelter for fish and, thus, may be a desirable spot for fishermen to fish. In some example embodiments, to make the fishing experience easier for the user rather than using a trolling pattern, the user may specify a boundary area for the watercraft to drift within. The system may be configured to detect when the watercraft is within the boundary area, near the perimeter of the boundary area and/or outside of the boundary area (such as using one or more position sensors of the watercraft (e.g., a Global Positioning System (GPS)). When the system detects that the watercraft 100 is outside of the boundary area and/or near the boundary area perimeter, the system may engage an autopilot to reposition the watercraft 100, such as to restart a drift within the boundary area.

FIG. 3 illustrates an example drift path 227 of a watercraft 200. In some embodiments, the watercraft 200 may be configured to drift within a boundary area 225. The drift along the drift path 227 may be driven by environmental conditions such as currents, wind speed and direction, tidal effects, etc. The boundary area 225, bound by a boundary area perimeter 220, may be defined by a user (e.g., fisherman 130 shown in FIG. 2). The boundary area 225 as described herein may correspond to structures, waypoints, previous boundary areas, desirable fishing habitats, sonar readings, depth values, among other things.

The watercraft 200 may drift from a starting position 223 through the boundary area 225. In some embodiments, the starting position 223 may be a current location of the watercraft 200, while in other embodiments, the starting position 223 may be selected by the user or determined by the drift protocol. In some embodiments, the watercraft 200 may navigate to the starting position 223 before entering into the drift protocol.

At the starting position 233, the watercraft 200 may enter into a drift protocol. In some embodiments, the drift protocol is initiated by the user and may include an indication of the boundary area 225 to be traversed. Entering the drift protocol may cause an autopilot (e.g., 681 shown in FIG. 7) to cease (or reduce) propulsion of the watercraft 200 at the starting position 223. For example, the autopilot may cause the propulsion system (e.g., motor 115, 127 shown in FIG. 1), to idle, thereby allowing the watercraft 200 to drift through the body of water via currents, or other environmental conditions, while maintaining power to the motor.

The drift protocol may allow the watercraft 200 to drift through the boundary area 225 along the drift path 227. The drift path 227 may be determined by the influence of nature, for example, currents, wind speed, wind direction, and/or tidal effect, among other things. In some embodiments, the autopilot may reengage the propulsion system (e.g., motor 115, 127) when the watercraft 200 has drifted near the boundary area perimeter 220, and/or outside of the boundary area 225. In some embodiments, an alert may be provided to the user, while in other embodiments, the system may automatically engage to navigate the watercraft 200 from outside the boundary area 225 back to the starting position 223 along an autopilot path 229. In some embodiments, the system may instruct the user how to navigate the watercraft 200 back to the starting position 223.

In some embodiments, the system may be in communication with a smart real and/or smart lure (e.g., lure 134 shown in FIG. 2). The system may determine the autopilot engaged the propulsion system to travel to the starting position 223, and in response cause the smart reel to retract the fishing line (e.g., 133 shown in FIG. 2). The retraction may allow the user to rebait and/or reposition the lure prior to the next drift, allowing more time for constructive fishing during the drift.

In some embodiments, a marine electronics device (MED) 460 may present a chart 462 displaying at least a portion of the body of water 101, as illustrated in FIGS. 4A-B. In some embodiments, the user may use the marine electronics device 460 to create a boundary area 425 bound by a boundary area perimeter 420. In some embodiments, shown in FIG. 4A a user may create the boundary area 425 by selecting a plurality of waypoints 440 on the chart 462. In some embodiments, the waypoints 440 may be preset geographical locations stored in a memory (e.g., 686 in FIG. 7). In some embodiments, the waypoints 440 may be preset by the user, while in other embodiments the waypoints 440 may be downloaded from an external network (e.g., 690 in FIG. 7).

In some embodiments, the boundary area 425 may be bound by at least three waypoints selected by the user. The MED 460 may connect the waypoints 440 to generate the boundary area perimeter 420. In some embodiments, the boundary area 425 may be an irregular shape (e.g., when a user selects waypoints 440 to avoid a certain area). In some embodiments, the MED 460 may connect the waypoints 440 with linear lines, while in other embodiments the MED 460 may be programmed to connect the waypoints 440 with curved lines to extend the boundary area 425. In some embodiments, two waypoints may be used to define a desired start and end to the boundary area. In some such example embodiments, a user may enter a distance outwardly from a line connecting the two waypoints to form the boundary area therefrom (e.g., between the two waypoints and 5 ft on either side).

In some embodiments, the MED 460 may suggest adjustments to the boundary area perimeter 420 to adjust the boundary area 425 to be an optimal size for the drift protocol. In some embodiments, the boundary area 425 may be sized to allow the drift path to be up to 0.1 miles, up to 0.2 miles or up to 0.25 miles. In some embodiments, the boundary area 425 may be sized with a smaller drift path, for example, between 30-40 feet, when the boundary area 425 is defined by a structure.

In some embodiments, the MED 460 may present environmental conditions 442 overlaid on to the chart 446. The environmental conditions 442 may instruct the user selection of waypoints 440. For example, if the wind speed or current speed is high, the user may choose waypoints 440 to make a larger boundary area 425.

In some embodiments, the MED 460 may suggest adjustments to the boundary area perimeter 420 to optimize the boundary area 425 based on a drift time. For example, the system may determine based on environmental conditions 442 an estimated drift time through the boundary area 425. In some embodiments, an optimal drift time may be at least 20 minutes, at least 25 minutes, or at least 30 minutes. Thus, if the environmental conditions 442 indicates conditions which translate to a faster moving watercraft 100, the system may suggest expanding the boundary area 425 to allow for the desired drift time. Similarly, if the environmental conditions 442 indicate conditions which translate to a slow moving watercraft 100 the system may suggest shrinking the boundary area so as to not exceed the drift time.

In some embodiments, a user may want to drift over a structure within the underwater environment of the body of water, as the structure may provide a habitat for fish. As illustrated in FIG. 4B, the user may specify the boundary area 425 to be bound by a known structure 420'. For example, a user may have prior sonar images corresponding to the known structure 420'. Thus, the user may be able to specify the boundary area 425 based on the known structure. In some embodiments, the known structure 420' may be at least partially submerged within the body of water 101. In some embodiments, the location of the known structure 420' may be retrieved from a local or remote database.

In some embodiments, other methods of defining the boundary area 425 may be utilized. For example, a user may use geographical coordinates, rely on depth values, depth contours, input a previously stored boundary area, and/or, in some embodiments, the user may draw the boundary directly on the chart 462. In embodiments, a user may input a drift time, and the MED 460 may determine the boundary area 425 based on estimations of the environmental conditions at the time. Thus, instead of a defined area, in some embodiments, the boundary area may be determined based on a time limitation. For example, a user may set a drift time of 15 minutes. After 15 minutes has elapsed the MED 460 may engage the autopilot and return to the starting position 423.

In some embodiments, the user may desire to have more lead time before the autopilot engages the propulsion system to cause the watercraft to navigate to the starting position. FIGS. 5A-B illustrate an example embodiment of a boundary area 325 defined by a boundary area perimeter 320 for a watercraft 300 to drift through along a drift path 327. The boundary area 325 may include a threshold boundary area 322 defined between a threshold boundary perimeter 321 and the boundary area perimeter 320. The system may provide an alert when the watercraft 300 crosses the threshold boundary perimeter 321 into the threshold boundary area 322, thus, informing the user that the drift protocol is about to engage the autopilot to navigate the watercraft 300 along an autopilot path 329 to a starting position 323. In some embodiments, the user may ignore the alert, or select an input to approve the watercraft 300 to engage the propulsion system to return to the starting position 323.

However, in some embodiments, the user may determine they are not ready to return to a starting position 323. Thus, as illustrated in FIG. 5B, the system may suggest extending the boundary area 325 to include an extended boundary area 328 bound by an extended boundary area perimeter 328a. In some embodiments, the extended boundary area 328 may be a predetermined size corresponding to the size of the boundary area 325. For example, in some embodiments, the size of the extended boundary area 328 may be up to 10%, up to 20%, or up to 30% of the size of the boundary area 325.

In some embodiments, the system may suggest the extended boundary area 328 to the user and may request a response in a threshold time. In an example embodiment, if a response is not received within the threshold time, the system may automatically extend the boundary area 325 to the extended boundary area 328, while in other embodiments, if a response is not received within the threshold time the system may engage the propulsion system to traverse an autopilot path 329 to the starting position 323. In some embodiments, the threshold time may be up to 30 seconds, up to 45 seconds or up to 1 minute.

In some embodiments, the system may determine the size of the extended boundary area 328 based on a time. In some embodiments, the system may use the environmental conditions (e.g., 442 FIG. 4B) to determine how far the watercraft 300 is able to drift during a time and estimate the extended boundary area 328 based on the time.

In some embodiments, a MED 560 may be configured to determine a drift effect 543 from environmental conditions 542 and/or a current 544 of the body of water 101. FIG. 6A illustrates the MED 560 presenting a chart 562 displaying a portion of the body of water 101, including land 502. In some embodiments, a boundary area 525 defined by a boundary area perimeter 520 may be input by a user and displayed on the chart 562. In some embodiments, the MED 560 may access external or internal databases and/or external or internal sensors to retrieve data corresponding to the environmental conditions 542 and currents 544. Using the environmental conditions 542 and currents 544 data, the MED 560 may estimate a drift effect 543 to estimate a drift path (e.g., 327 shown in FIG. 3) to indicate a prediction of how the watercraft 100 will move through the boundary area 525.

In some embodiments, the chart 562 may present an overlay of the effect of each of the conditions. For example, the chart 562 may include an overlay 542* of the effects of the environmental condition, illustrated as wind speed and direction. Thus, the overlay 542* provides an arrow pointing north-east on the chart 562. Similarly, the chart 562 includes a second overlay 544* of the current conditions 544 of the body of water. The data indicates that the current is flowing at 3 miles an hour in a southern direction, therefore the second overlay 544* is pointing south on the chart 562. In some embodiments, the length of the overlay 542*, 544* may indicate the intensity of the effect. For example, a longer arrow may indicate a higher speed, and a shorter arrow may indicate a lower speed, thus, the overlay 542* corresponding to a wind speed of 5 miles per hour is longer than the overlay 544* corresponding to the current effect of 3 miles per hour.

Based on one or more various factors contributing to the drift effect 543, the MED may predict the drift effect 543 and generate a drift effect overlay 543* to be presented on the chart 562. In some embodiments, the system may further identify the drift time and distance within the boundary area 525. In the illustrated embodiment, based on the environmental conditions 542 (e.g., wind speed and direction), and the current 544 (e.g., speed and direction), a drift effect 543 (e.g., speed and direction) may be determined. The system may use the boundary area 525 to estimate the distance of the drift and the time of the drift.

In some embodiments, the user may want to maximize the drift time, as a longer drift time may allow the user a greater opportunity to catch fish. The MED 560 may use the drift effect 543 to determine a starting position (e.g., 423 in FIG. 5A) which will maximize the drift time. Alternatively, other drift characteristics may be desired, such as drifting across one or more points within the boundary area, drifting in a certain orientation, etc. the MED 560 may, in such circumstances, determine an appropriate starting position to achieve the desired drift characteristics.

In some embodiments, the watercraft 100 may drift outside of the boundary area 525 before reaching the estimated drift length or drift time. For example, if the boundary area is an irregular shape, or comprises a bend or turn. Thus, the MED 560 may determine the watercraft 100 has traveled outside of the boundary area. However, rather than issuing an alert and engaging the propulsion system, the MED 560 may determine based on the drift effect 543 that the watercraft 100 will reenter the boundary area 525 and continue to drift. In other embodiments, the MED 560 may determine the watercraft 100 will not reenter the boundary area, and in such an instance the autopilot may be engaged to cause the watercraft 100 to navigate to a determined starting position.

The MED 560 may be configured to record a track 546 corresponding to the drift effect 543, such as illustrated in FIG. 6B. The MED 560 may be configured to record the position of the watercraft 100 as the watercraft 100 drifts within the boundary area 525. In some embodiments, the user may be able to input data corresponding to the track 546. For example, the user may be able to record the number of fish caught, and fish data corresponding to caught fish (e.g., weight, length, species, etc.). In some embodiments, the user may be able to review sonar images corresponding to the track 546. Thus, the user may be able to view data corresponding to previously recorded tracks to determine if the user wants to return to or near the recorded track 546. Similarly, the user may use the data to determine any adjustments to the boundary area (e.g., extending, shrinking, etc.).

In some embodiments, the user may want to retrace the recorded track 546. The MED 560 may update the environmental conditions 542' and the current conditions 544' when the watercraft 100 exits the boundary area 525 to determine a starting location 523' such that the watercraft 100 will closely follow the recorded track 546 of the previous drift corresponding to the drift effect 543'. In some embodiments, the starting position 523' may be at a different position than a previous starting position 523 used for the recorded track 546.

In some embodiments, the orientation of the watercraft 100 may be monitored throughout the drift. In some embodiments, the watercraft 100 may have a predetermined (e.g., desirable) orientation in the direction of the drift. Thus, for example, in FIG. 6B, the predetermined orientation of the watercraft 100 may be such that the bow of the watercraft 100 is facing east. In some embodiments, the predetermined orientation may define a range. In some embodiments, the range may vary by up to 20 degrees, up to 30 degrees, or even up to 45 degrees from the predetermined orientation. In some embodiments, the range may be preset, or set by the user. In some embodiments, the orientation of the watercraft 100 may be determined by a gyroscope, positioning sensor, or similar.

In some embodiments, the watercraft 100 may engage the propulsion system to rotate the watercraft 100 to the desired orientation. In some embodiments, the watercraft 100 may have one or more motors engaged to maintain the orientation of the watercraft 100 along the drift path. In such embodiments, the motor is engaged when needed to rotate the watercraft 100. In some embodiments, the motor may engage when the orientation of the watercraft is shifted from the predetermined orientation for a period of time, for example, more than 20 seconds, more than 45 seconds or more than 1 minute. In some embodiments, the motor may engage when the orientation of the watercraft is shifted from the predetermined orientation a certain threshold number of degrees, such as 5 degrees, 15 degrees, 10 degrees, 30 degrees, etc. In some embodiments, an alert may be provided before engaging the motor to provide the user with an indication the motor is being engaged for watercraft rotation while maintaining the drift protocol.

Example System Architecture

FIG. 7 illustrates a block diagram of an example system 600 according to various embodiments of the present invention described herein. The illustrated system 600 includes a marine electronic device 660. In some embodiments, the system 600 may comprise numerous marine devices, such as one or more sonar transducer assemblies 618, one or more fishing rods 632, a rudder 616, a primary motor 627, a trolling motor 615, and one or more additional sensors 619. One or more marine devices may be implemented on/within the marine electronic device 660. For example, a position sensor 683, a direction sensor 684, an autopilot 681, and other sensors 687 may be provided within the marine electronic device 660. These marine devices can be integrated within the marine electronic device 660, integrated on a watercraft at another location and connected to the marine electronic device 660, and/or the marine devices may be implemented at a remote device 691 in some embodiments. The system 600 may include any number of different systems, modules, or components; each of which may comprise any device or means embodied in either hardware, software, or a combination of hardware and software configured to perform one or more corresponding functions described herein.

The marine electronic device 660 may include at least one processor 670, a memory 686, a communication interface 685, a user interface 680, a display 682, autopilot 681, and one or more sensors (e.g., position sensor 683, direction sensor 684, other sensors 687). One or more of the components of the marine electronic device 660 may be located within a housing or could be separated into multiple different housings (e.g., be remotely located).

The processor(s) 670 may be any means configured to execute various programmed operations or instructions stored in a memory device (e.g., memory 686) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the at least one processor 670 as described herein. For example, the at least one processor 670 may be configured to analyze sonar return data for various features/functions described herein (e.g., generate a sonar image, determine an object and/or object position, etc.).

In some embodiments, the at least one processor 670 may be further configured to implement signal processing. In some embodiments, the at least one processor 670 may be configured to perform enhancement features to improve the display characteristics of data or images, collect or process additional data, such as time, temperature, GPS information, waypoint designations, current, environmental conditions (e.g., wind speed, wind direction) or others, or may filter extraneous data to better analyze the collected data. The at least one processor 670 may further implement notices and alarms, such as those determined or adjusted by a user, to indicate, for example, exiting the boundary area, approaching the boundary area, proximity of other objects (e.g., represented in sonar data), proximity of other vehicles (e.g. watercraft), approaching storms, etc.

In an example embodiment, the memory 686 may include one or more non-transitory storage or memory devices such as, for example, volatile and/or non-volatile memory that may be either fixed or removable. The memory 686 may be configured to store instructions, computer program code, sonar data, and additional data such as radar data, chart data, bathymetric data, location/position data in a non-transitory computer readable medium for use, such as by the at least one processor 670 for enabling the marine electronic device 660 to carry out various functions in accordance with example embodiments of the present invention. For example, the memory 686 could be configured to buffer input data for processing by the at least one processor 670. Additionally or alternatively, the memory 686 could be configured to store instructions for execution by the at least one processor 670.

The communication interface 685 may be configured to enable communication to external systems (e.g. an external network 690). In this manner, the marine electronic device 660 may retrieve stored data from a remote device 691 via the external network 690 in addition to or as an alternative to the onboard memory 686. Additionally or alternatively, the marine electronics device 660 may store marine data locally, for example within the memory 686. Additionally or alternatively, the marine electronic device 660 may transmit or receive data, such as environmental conditions. In some embodiments, the marine electronic device 660 may also be configured to communicate with other devices or systems (such as through the external network 690 or through other communication networks, such as described herein). For example, the marine electronic device 660 may communicate with a propulsion system of the watercraft 100 (e.g., for autopilot control); a remote device (e.g., a user's mobile device, a handheld remote, etc.); or another system. Using the external network 690, the marine electronic device 660 may communicate with and send and receive data with external sources such as a cloud, server, etc. The marine electronic device 660 may send and receive various types of data. For example, the system may receive weather data, tidal data, data from other fish locator applications, alert data, current data, among others. However, this data is not required to be communicated using external network 690, and the data may instead be communicated using other approaches, such as through a physical or wireless connection via the communications interface 685.

The communications interface 685 of the marine electronic device 660 may also include one or more communications modules configured to communicate with one another in any of a number of different manners including, for example, via a network. In this regard, the communications interface 685 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or sonar transducer assemblies) may be included in the system 600.

The position sensor 683 may be configured to determine the current position and/or location associated with travel of the marine electronic device 660 (and/or the watercraft 100). For example, the position sensor 683 may comprise a GPS, bottom contour, inertial navigation system, such as machined electromagnetic sensor (MEMS), a ring laser gyroscope, or other location detection system. Additionally or alternately, the position sensor 683 may be configured to determine the orientation of the watercraft 100. Alternatively or in addition to determining the location of the marine electronic device 660 or the watercraft 100, the position sensor 683 may also be configured to determine the position and/or orientation of an object outside of the watercraft 100. In some embodiments, the position sensor 683 may be configured to determine a location associated with travel of the watercraft. For example, the position sensor 683 may utilize other sensors 687 (e.g., speed sensor, and/or direction sensor 680) to determine a future position of the watercraft 100 and/or a waypoint along the route of travel.

The display 682 (e.g. one or more screens) may be configured to present images and may include or otherwise be in communication with a user interface 680 configured to receive input from a user. The display 680 may be, for example, a conventional LCD (liquid crystal display), a touch screen display, mobile device, or any other suitable display known in the art upon which images may be displayed.

In some embodiments, the display 680 may present one or more sets of data (or images generated from the one or more sets of data). Such data includes chart data, radar data, sonar data, weather data, location data, position data, orientation data, environmental data, sonar data, or any other type of information relevant to the watercraft. Environmental data may be received from the external network 690, retrieved from the other sensors 687, and/or obtained from sensors positioned at other locations, such as remote from the watercraft. Additional data may be received from marine devices such as a radar, a primary motor 617 or an associated sensor, a trolling motor 615 or an associated sensor, an autopilot 681, a rudder 616 or an associated sensor, a position sensor 683, a direction sensor 684, additional sensors 619, a fishing rod 632, a remote device 690, onboard memory 686 (e.g., stored chart data, historical data, etc.), or other devices.

In some further embodiments, the communication interface 658 may be configured to be in data communication with a fishing rod 632. The fishing rod 632 may include a smart reel 636 or a smart lure 634, which may also be in communication with the communication interface 685. In some embodiments, the fishing rod 632, smart reel 632 and/or smart lure 634 may be able to determine when the autopilot 681 is engaged. In some embodiments, the fishing rod 632, smart reel 632 and/or smart lure 634 may retract upon engagement of the autopilot 681.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 680 may include, for example, a keyboard, keypad, function keys, mouse, scrolling device, input/output ports, touch screen, or any other mechanism by which a user may interface with the system.

Although the display 682 of FIG. 7 is shown as being directly connected to the at least one processor 670 and within the marine electronic device 660, the display 682 could alternatively be remote from the at least one processor 670 and/or marine electronic device 660. Likewise, in some embodiments, the position sensor 683 and/or user interface 680 could be remote from the marine electronic device 660.

The marine electronic device 660 may include one or more other sensors/devices 687, such as configured to measure or sense various other conditions. The other sensors/devices 687 may include, for example, an air temperature sensor, a water temperature sensor, a current sensor, a light sensor, a wind sensor, a speed sensor, tide sensor, or the like.

The components presented in FIG. 7 may be rearranged to alter the connections between components. For example, in some embodiments, a marine device outside of the marine electronic device 660, such as the radar, may be directly connected to the at least one processor 670 rather than being connected to the communication interface 678. Additionally, sensors and devices implemented within the marine electronic device 660 may be directly connected to the communications interface 678 in some embodiments rather than being directly connected to the at least one processor 670.

Example Flowchart(s) and Operations

Some embodiments of the present invention provide methods, apparatus, and computer program products related to various embodiments described herein. Various examples of the operations performed in accordance with embodiments of the present invention will now be provided. FIG. 8 presents a flow chart with an example method of providing navigation control of a watercraft on a body of water according to various embodiments described herein. The method may be performed by a wide variety of components, including, but not limited to, one or more processors, one or more microprocessors, and one or more controllers. In some embodiments, a marine electronic device 660 (FIG. 7) may comprise one or more processors that perform the functions shown in FIG. 8. Further, the method may be provided on a piece of software which runs on a central server that is at a remote location away from the watercraft, and the remote server may communicate with a processor or a similar component on the watercraft. Additionally, the methods could be integrated into a software update that may be installed onto existing hardware, or the methods may be integrated into the initial software or hardware provided in a radar unit, watercraft, server, etc.

FIG. 8 is a flowchart of an example method 700 for providing navigational control of a watercraft on a body of water, in accordance with some embodiments discussed herein. The operations illustrated in and described with respect to FIG. 8 may, for example, be performed by, with the assistance of, and/or under the control of one or more of the processor 670, memory 686, communication interface 685, user interface 680, position sensor 683, direction sensor 684, other sensor 687, autopilot 681, display 682, and/or external network 690/remote device 691.

At operation 702, the method 700 may comprise causing presentation of a chart indicating at least a portion of a body of water. At operation 704, the method 700 may comprise receiving user input indicating initiation of a drift protocol. In some embodiments, the initiation may be user selected, while in other embodiments the drift protocol may be initiated automatically upon reaching the starting position. At operation 706, the method 700 may comprise causing on the display presentation of a boundary area on the chart. In some embodiments, the boundary area may be defined by the user, while in other embodiments the boundary area may correspond to a known structure, at least partially submerged within the body of water. At operation 708, the method 700 may comprise determining an instance in which the watercraft drifts outside of the boundary area. At operation 710, the method 700 may comprise determining a starting position corresponding to the boundary area.

In some embodiments, the method 700 may continue at operation 712a. At operation 712a, the method 700 may comprise causing an autopilot to cause the watercraft to navigate to the starting position. In other embodiments, the method 700 may continue to operation 712b from operation 710. At operation 712b, the method 700 may comprise causing presentation of one or more instructions on the display to enable a user to navigate the watercraft to the starting position.

FIG. 8 illustrates a flowchart of a system, method, and computer program product according to various example embodiments. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 686 and executed by, for example, the processor 670. As will be appreciated, any such computer program product may be loaded onto a computer or other programmable apparatus (for example, a marine electronic device 660) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 660) to cause a series of operations to be performed on the computer or other programmable apparatus to produce a computer-implemented process such that the instructions which execute on the computer or other programmable apparatus implement the functions specified in the flowchart block(s).

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A system for providing navigation control of a watercraft on a body of water, the system comprising:
    a display;
    a processor; and
    a memory including computer program code, the computer program code configured to, when executed, cause the processor to:
        cause, on the display, presentation of a chart indicating at least a portion of the body of water;
        receive data corresponding to environmental conditions;
        receive user input indicating initiation of a drift protocol, wherein the user input includes an indication of a boundary area defined by at least three waypoints for which the watercraft is to drift through;
        cause, on the display, presentation of the boundary area on the chart;
        determine a drift effect based on the received data corresponding to the environmental conditions;
        determine an instance in which the watercraft drifts outside of the boundary area or is nearing a perimeter of the boundary area;
        cause, in response to determining that the watercraft has drifted outside of the boundary area or is nearing the perimeter of the boundary area, an alert to be provided to the user indicating that the watercraft is outside of the boundary area or near the perimeter of the boundary area;
        determine a starting position corresponding to the boundary area defined by the at least three waypoints, wherein the starting position is determined to maximize a drift time within the boundary area based on the drift effect, wherein the drift time corresponds to movement through the boundary area without propulsion of the watercraft; and
        automatically cause an autopilot to navigate the watercraft to the starting position using propulsion of the watercraft; and cease propulsion of the watercraft at the starting position to enable the watercraft to drift under influence of the environmental conditions through the boundary area.

2. The system of claim 1, wherein the computer program code is further configured to, when executed, cause the processor to:
    cause the autopilot of the watercraft to cease propulsion of the watercraft once the watercraft reaches the starting position.

3. The system of claim 1, wherein the boundary area corresponds to at least a portion of a known structure, wherein the known structure is at least partially submerged within the body of water.

4. The system of claim 1, wherein the computer program code is further configured to, when executed, cause the processor to:
    modify the boundary area based on the received data corresponding to the environmental conditions and then determine drift effect to achieve the drift time within the boundary area.

5. The system of claim 4, wherein the computer program code is further configured to, when executed, cause the processor to:
    determine the watercraft is outside of the boundary area; and
    determine if the watercraft will reenter the boundary area based on the drift effect.

6. The system of claim 4, wherein the environmental conditions are at least one of a tidal effect, a wind speed, a wind direction, or current.

7. The system of claim 4, wherein the computer program code is further configured to, when executed, cause the processor to:
    record a track corresponding to the drift effect; and
    determine the starting position such that a second drift closely follows the track corresponding to the drift effect.

8. The system of claim 1, wherein the starting position is different than a previous starting position.

9. The system of claim 1, wherein the starting position is selected by a user.

10. The system of claim 1, wherein the computer program code is further configured to, when executed, cause the processor to:
    determine an orientation of the watercraft;
    cause, in response to determining the watercraft is not in a predetermined orientation, the watercraft to rotate to the predetermined orientation.

11. The system of claim 1, wherein the computer program code is further configured to, when executed, cause the processor to:
    cause operation of one or more motors to maintain a predetermined orientation of the watercraft while engaged in the drift protocol.

12. The system of claim 1, further comprising at least one reel, wherein the computer program product is further configured to, when executed, cause processor to:

receive an indication the autopilot has engaged propulsion to travel to the starting position; and retract a lure associated with a reel upon receipt of the indication.

13. A method of providing navigation control of a watercraft on a body of water, the method comprising:

causing, on a display, a presentation of a chart indicating at least a portion of a body of water;

receiving data corresponding to environmental conditions;

receiving user input indicating initiation of a drift protocol, wherein the user input includes an indication of a boundary area defined by at least three waypoints for which the watercraft is to drift through;

causing, on the display, presentation of the boundary area on the chart;

determining a drift effect based on the received data corresponding to the environmental conditions;

determining an instance in which the watercraft drifts outside of the boundary area;

determine a starting position corresponding to the boundary area defined by the at least three waypoints, wherein the starting position is determined to maximize a drift time within the boundary area based on the drift effect, wherein the drift time corresponds to movement through the boundary area without propulsion of the watercraft; and automatically cause an autopilot to navigate the watercraft to the starting position using propulsion of the watercraft; and cease propulsion of the watercraft at the starting position to enable the watercraft to drift under influence of the environmental conditions through the boundary area.

14. The method of claim 13, further comprising:

causing, in response to determining that the watercraft has drifted outside of the boundary area, an alert to be provided to the user indicating that the watercraft is outside of the boundary area.

15. The method of claim 13, further comprising:

causing the autopilot of the watercraft to cease propulsion of the watercraft once the watercraft reaches the starting position.

16. The method of claim 13 further comprising:

modifying the boundary area based on the received data corresponding to the environmental conditions and the determined drift effect to achieve the drift time within the boundary area.

17. The method of claim 16, wherein the environmental conditions are at least one of a tidal effect, a wind speed, a wind direction, or current.

18. The method of claim 13 further comprising:

maintaining a predetermined orientation of the watercraft while engaged in the drift protocol.

19. A system for providing navigation control of a watercraft on a body of water, the system comprising:

a display;

a processor; and a memory including computer program code, the memory and computer program code configured to, when executed, cause the processor to:

cause, on the display, presentation of a chart indicating at least a portion of the body of water;

receive data corresponding to environmental conditions;

receive user input indicating initiation of a drift protocol, wherein the user input includes an indication of a boundary area defined by at least three waypoints for which the watercraft is to drift through;

cause, on the display, presentation of the boundary area on the chart;

determine a drift effect based on the received data corresponding to the environmental conditions;

determine an instance in which the watercraft drifts within a threshold distance of the boundary area;

cause, in response to determining that the watercraft has drifted within the threshold distance of the boundary area, an alert to be provided to the user indicating that the watercraft is within the threshold distance of the boundary area;

determine a starting position corresponding to the boundary area defined by the at least three waypoints, wherein the starting position is determined to maximize a drift time within the boundary area based on the drift effect, wherein the drift time corresponds to movement through the boundary area without propulsion of the watercraft; and automatically cause an autopilot to navigate the watercraft to the starting position using propulsion of the watercraft; and cease propulsion of the watercraft at the starting position to enable the watercraft to drift under influence of the environmental conditions through the boundary area.

20. The system of claim 19, wherein the computer program code is further configured to, when executed, cause the processor to:

determine if a selection has been made within a threshold time; and in response to no selection being made, extend the boundary area to the extended boundary area.

* * * * *